US008805286B2

(12) United States Patent
Hamada (10) Patent No.: US 8,805,286 B2
(45) Date of Patent: Aug. 12, 2014

(54) WIRELESS COMMUNICATION DEVICE, HIGH-FREQUENCY CIRCUIT SYSTEM, AND LOCAL LEAK REDUCTION METHOD

(75) Inventor: Yasuhiro Hamada, Tokyo (JP)

(73) Assignee: NEC Corporation, Tokyo (JP)

( * ) Notice: Subject to any disclaimer, the term of this patent is extended or adjusted under 35 U.S.C. 154(b) by 115 days.

(21) Appl. No.: 13/641,737

(22) PCT Filed: Apr. 21, 2011

(86) PCT No.: PCT/JP2011/002338
§ 371 (c)(1),
(2), (4) Date: Oct. 17, 2012

(87) PCT Pub. No.: WO2011/135807
PCT Pub. Date: Nov. 3, 2011

(65) Prior Publication Data
US 2013/0040582 A1  Feb. 14, 2013

(30) Foreign Application Priority Data

Apr. 27, 2010  (JP) ................................. 2010-102343

(51) Int. Cl.
*H04B 1/00* (2006.01)
*H04B 15/00* (2006.01)

(52) U.S. Cl.
USPC .................... 455/63.1; 455/67.11; 455/67.14; 455/114.2; 455/296

(58) Field of Classification Search
USPC ................. 455/24, 63.1, 67.11, 67.13, 67.14, 455/82–83, 115.1–115.3, 114.1–114.3, 455/226.1–226.3, 278.1, 296
See application file for complete search history.

(56) References Cited

U.S. PATENT DOCUMENTS

| 6,167,247 | A  | * | 12/2000 | Kannell et al. | ................ | 455/317 |
| 6,567,649 | B2 | * | 5/2003 | Souissi | ........................... | 455/83 |
| 6,999,744 | B2 | * | 2/2006 | Kim | .............................. | 455/310 |
| 7,403,760 | B1 | * | 7/2008 | Gao | .............................. | 455/312 |

(Continued)

FOREIGN PATENT DOCUMENTS

| JP | 07058791 A | 3/1995 |
| JP | 0983587 A | 3/1997 |

(Continued)

OTHER PUBLICATIONS

The international search report for PCT/JP2011/002338 mailed on May 24, 2011.

*Primary Examiner* — Tuan A Tran
(74) *Attorney, Agent, or Firm* — Sughrue Mion, PLLC (57) ABSTRACT

A wireless communication device according to the present invention includes high-frequency circuits 20 to 22 that convert an input signal into a high-frequency signal; a power detection circuit 40 that detects power of the high-frequency signal output from the high-frequency circuits 20 to 22; a common correction circuit 12 that performs a common correction on the signal output to the high-frequency circuits 20 to 22 to reduce local leaks occurring in the high-frequency circuits 20 to 22, according to the power of at least one high-frequency signal detected by the power detection unit 40; and an individual correction circuit 11 that performs a correction for each signal output to the high-frequency circuits 20 to 22 to reduce local leaks occurring in the high-frequency circuits 20 to 22, according to the power of each high-frequency signal detected by the power detection unit 40.

10 Claims, 10 Drawing Sheets

(56) References Cited

U.S. PATENT DOCUMENTS

| | | | |
|---|---|---|---|
| 7,809,334 B2 * | 10/2010 | Chen et al. | 455/63.1 |
| 7,911,254 B2 * | 3/2011 | Ohba et al. | 327/307 |
| 8,090,036 B2 * | 1/2012 | Okada et al. | 375/260 |
| 8,135,348 B2 * | 3/2012 | Aparin | 455/63.1 |
| 8,280,327 B2 * | 10/2012 | Hsu et al. | 455/226.1 |
| 8,285,508 B2 * | 10/2012 | Yanagisawa et al. | 702/106 |
| 8,515,379 B2 * | 8/2013 | Hsu et al. | 455/296 |
| 2005/0107051 A1 * | 5/2005 | Aparin et al. | 455/126 |
| 2009/0174456 A1 | 7/2009 | Yanagisawa et al. | |

FOREIGN PATENT DOCUMENTS

| | | |
|---|---|---|
| JP | 2005295376 A | 10/2005 |
| JP | 2010021747 A | 1/2010 |
| WO | 2007122844 A1 | 11/2007 |

* cited by examiner

WIRELESS COMMUNICATION DEVICE, HIGH-FREQUENCY CIRCUIT SYSTEM, AND LOCAL LEAK REDUCTION METHOD

TECHNICAL FIELD

The present invention relates to a wireless communication device, a high-frequency circuit system, and a local leak reduction method. In particular, the present invention relates to a wireless communication device that reduces local leaks by correction, a high-frequency circuit system that reduces local leaks by correction, and a local leak reduction method using the wireless communication device.

BACKGROUND ART

To improve the quality of wireless communication, there is a demand for a wireless device that outputs only desired signals and does not output unwanted signals. Examples of unwanted signals include a leak (local leak) of a local signal (carrier signal). In the wireless device, the local signal drives a mixer, and a high power level is required to drive the mixer. Therefore, suppression of the local leak is a major issue, and various techniques for dealing with this issue are publicly known.

In this regard, Patent Literature 1 discloses a local leak reduction circuit for reducing local leaks. The local leak reduction circuit supplies a test signal to a quadrature modulation unit within the local leak reduction circuit. A baseband signal having an amplitude of 0 is used as the test signal. The use of such a test signal allows the signal output from the quadrature modulation unit to include only local signal components that are input to the quadrature modulation unit. Accordingly, the signal output from the quadrature modulation unit is treated as the local leak. In this case, a level detection unit detects the level (power) of the local leak and adds an offset to the baseband signal so as to minimize the detected power. This results in reducing the local leak.

Patent Literature 2 also discloses a technique in which a signal for test is input to detect power output from the quadrature modulation unit, and the input signal is controlled based on the detected result.

In recent years, wireless devices using a beam forming technique have been actively developed to improve the communication quality and to provide over-the-horizon communication. In a typical transmission device using the beam forming technique, a single baseband signal is input to a transmitting circuit and high-frequency signals are output from a plurality of antennas. There is an appropriate phase difference between the output high-frequency signals, so a desired beam pattern is obtained. The transmission device using the beam forming technique includes a plurality of high-frequency circuits, and a single baseband signal is converted into a plurality of high-frequency signals.

CITATION LIST

Patent Literature

[Patent Literature 1] Japanese Unexamined Patent Application Publication No. 07-058791
[Patent Literature 2] International Patent Publication No. WO 2007/122844

SUMMARY OF INVENTION

Technical Problem

However, the local leak reduction circuit as disclosed in Patent Literatures 1 and 2 has a problem of being unsuitable for a wireless device incorporating a plurality of high-frequency circuits as typified by a beam forming transmitter. This is because when the level detection unit disclosed in Patent Literature 1 is provided to each high-frequency circuit to reduce the amount of local leak of the entire wireless device, the circuit size and the chip area increase, resulting in an increase in power consumption and cost.

The present invention has been made to solve such a problem, and it is an object of the present invention to provide a wireless communication device, a high-frequency circuit system, and a local leak reduction method which reduce local leaks of a wireless device including a plurality of high-frequency circuits.

Solution to Problem

A wireless communication device according to a first aspect of the present invention includes: a plurality of high-frequency circuits that convert an input signal into a high-frequency signal; a power detection unit that detects power of the high-frequency signal output from each of the high-frequency circuits; a first correction circuit that performs a common correction on the input signal to be output to each of the high-frequency circuits, to reduce local leaks occurring in the high-frequency circuits, according to the power of at least one high-frequency signal detected by the power detection unit; and a second correction circuit that performs a correction for each input signal to be output to the high-frequency circuits, to reduce local leaks occurring in the high-frequency circuits, according to the power of each high-frequency signal detected by the power detection unit.

A high-frequency circuit system according to a second aspect of the present invention includes: a plurality of high-frequency circuits that convert an input signal into a high-frequency signal; a power detection unit that receives a high-frequency radio signal transmitted from each of the high-frequency circuits, and detects power of the high-frequency radio signal; a first correction circuit that performs a common correction on the input signal to be output to each of the high-frequency circuits, to reduce local leaks occurring in the high-frequency circuits, according to the power of at least one high-frequency signal detected by the power detection unit; and a second correction circuit that performs a correction for each input signal to be output to the high-frequency circuits, to reduce local leaks occurring in the high-frequency circuits, according to the power of each high-frequency signal detected by the power detection unit.

A local leak reduction method according to a third aspect of the present invention includes the steps of: detecting power of a high-frequency signal output from a high-frequency circuit selected from a plurality of high-frequency circuits that convert an input signal into a high-frequency signal; performing a common correction on the input signal to be output to each of the high-frequency circuits, to reduce local leaks occurring in the high-frequency circuits, according to the power of the detected high-frequency signal; and performing a correction for each input signal to be output to the high-frequency circuits, to reduce local leaks occurring in the high-frequency circuits, according to the power of each of the detected high-frequency signals.

Advantageous Effects of Invention

According to the present invention, it is possible to provide a wireless communication device, a high-frequency circuit system, and a local leak reduction method which reduce local leaks of a wireless device including a plurality of high-frequency circuits.

DESCRIPTION OF EMBODIMENTS

First Exemplary Embodiment

Figure 1:
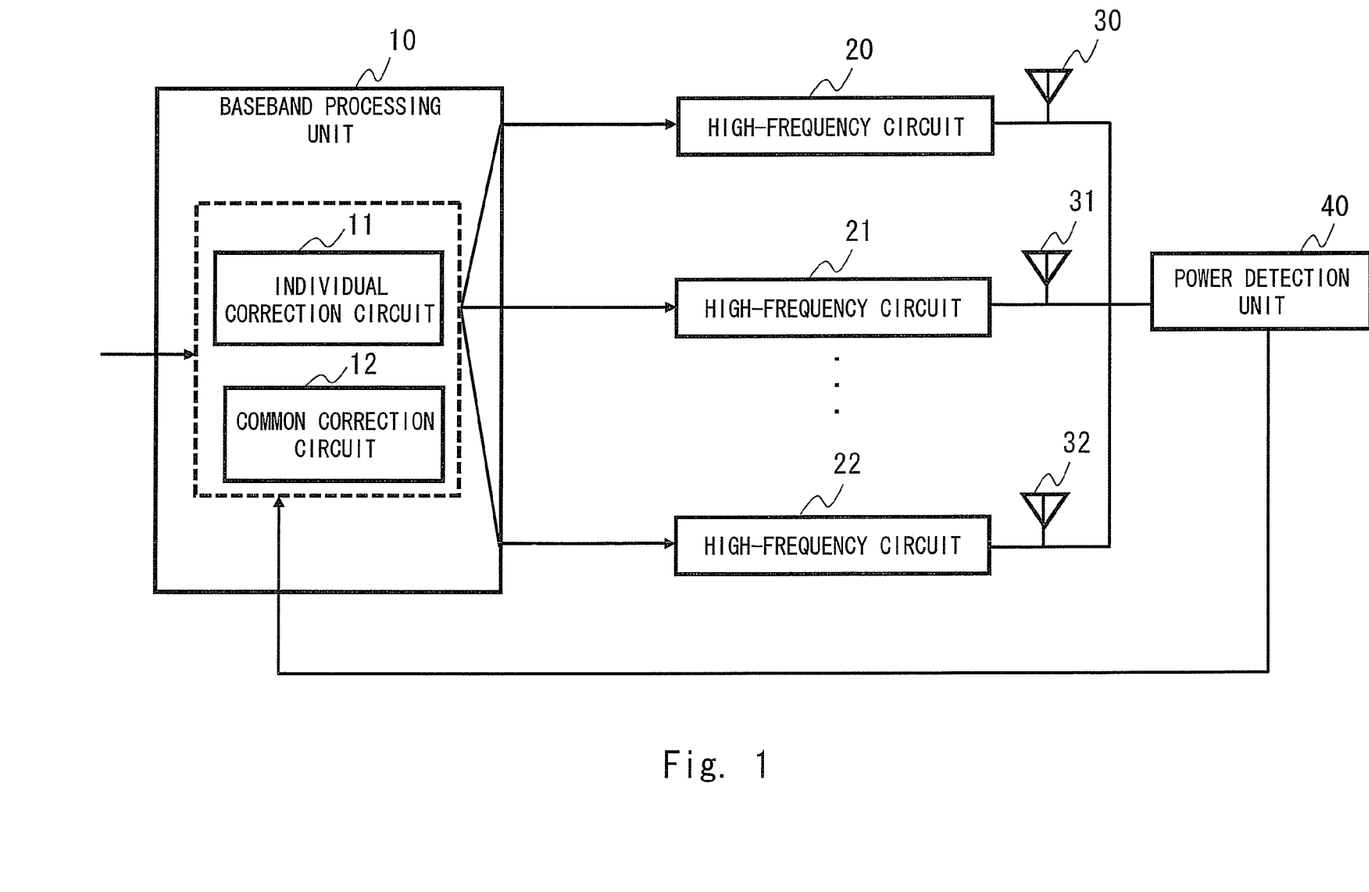
FIG. 1 is a block diagram of a wireless device according to a first exemplary embodiment.

Exemplary embodiments of the present invention will be described below with reference to the drawings. Referring to FIG. 1, a configuration example of a wireless communication device according to a first exemplary embodiment of the present invention will be described. The wireless communication device includes a baseband processing unit 10, high-frequency circuits 20 to 22, antennas 30 to 32, and a power detection unit 40. The baseband processing unit 10 includes an individual correction circuit 11 and a common correction circuit 12.

The baseband processing unit 10 implements baseband processing for an input signal, and outputs the input signal to the plurality of high-frequency circuits 20 to 22. Accordingly, the baseband processing unit 10 distributes the input signal to a plurality of paths, and outputs the input signal to the high-frequency circuits 20 to 22.

The high-frequency circuit 20 modulates the input signal output from the baseband processing unit 10, to thereby generate a high-frequency signal. The high-frequency circuit 20 generates the high-frequency signal by using a local signal output from an oscillator (not shown) and the input signal output from the baseband processing unit 10. The high-frequency circuits 21 and 22 also generate the high-frequency signal. Note that FIG. 1 illustrates an example of the wireless communication device having three high-frequency circuits, but the number of high-frequency circuits is not limited to three. The same holds true for the following description. The high-frequency circuit 20 outputs the generated high-frequency signal to each of the antenna 30 and the power detection unit 40. The high-frequency circuits 21 and 22 also output the generated high-frequency signal to the antenna 31 or 32 and the power detection unit 40.

The antenna 30 transmits the high-frequency signal output from the high-frequency circuit 20 to an external device or the like as a radio signal. The antennas 31 and 32 also transmit the high-frequency signals output from the high-frequency circuits 21 and 22 to an external device or the like as radio signals.

The power detection unit 40 detects power of the high-frequency signals output from the high-frequency circuits 20 to 22. Specifically, the power detection unit 40 detects the power (level) of local leaks based on the high-frequency signals output from the high-frequency circuits 20 to 22. An exemplary method for detecting the local leak power will be described below.

The baseband processing unit 10 outputs test signals having an amplitude of 0 to the high-frequency circuits 20 to 22. In this case, since the input signals supplied to the high-frequency circuits 20 to 22 have an amplitude of 0, signals output from the high-frequency circuits 20 to 22 include only local leaks having local signal components output from the oscillator. The power detection unit 40 detects the power of the signals output from the high-frequency circuits 20 to 22, and outputs the detection result to the baseband processing unit 10. The common correction circuit 12 monitors the power of local leaks output from the power detection unit 40, while changing the phase, power, and the like of the signals to be output to the high-frequency circuits 20 to 22. The common correction circuit 12 holds a control value (offset amount) in the case where the power of local leaks output from the power detection unit 40 is minimized, and adds the held offset amount to the signals to be output to the high-frequency circuits 20 to 22. Examples of the offset amount include a voltage and a digital value. In this manner, the power of the local leak signal of any of the high-frequency circuits 20 to 22 is detected to determine the offset amount that minimizes the power, and the offset amount is commonly applied to the signals to be output to the high-frequency circuits 20 to 22.

Next, the individual correction circuit 11 also determines the offset amount that minimizes the power of the local leak signals output from the high-frequency circuits 20 to 22. In this case, the determined offset amount is applied only to the signal to be output to the high-frequency circuit, the local leak signal of which is detected. In other words, the offset amount determined using the local leak signal output from the high-frequency circuit 21 is added only to the signal to be output to the high-frequency circuit 21.

Now, the reason for applying the offset amount to the signals to be output to the high-frequency circuits 20 to 22 will be described with reference to the individual correction circuit 11 and the common correction circuit 12. In a wireless communication device including a plurality of high-frequency circuits, a local leak (hereinafter referred to as "systematic local leak") that occurs commonly in a plurality of high-frequency circuits and a local leak (hereinafter referred to as "random local leak") that occurs independently in each of the high-frequency circuits are present.

For example, the systematic local leak is caused by factors such as the imperfection of a balun circuit, which performs differentiation and non-differentiation of single-ended signals, and the layout asymmetry. The systematic local leak occurring in this manner is reduced by using the offset amount common to the signals to be output to the high-frequency circuits.

The random local leak is caused by factors such as variations in threshold of FETs forming a differential pair. Thus, the variations in threshold of the transistors included in the respective high-frequency circuits are different from each other. Accordingly, it is necessary to use different offset amounts for the signals to be output to the respective high-frequency circuits.

As described above, the use of the wireless communication device according to the first exemplary embodiment of the present invention enables calculation of the offset amounts for the systematic local leak and the random local leak and application of the calculated offset amounts to the signals to be output to the high-frequency circuits 20 to 22. When only the offset amount for reducing the random local leak is used without using the offset amount for reducing the systematic local leak, the following problem occurs. In the above-mentioned case, it is necessary to calculate and apply the offset amount to deal with the systematic local leak and the random local leak at a time. This results in the necessity to cause a correction circuit having a high resolution to operate in a wide correction range. This leads to an increase in chip area, power consumption, and cost.

On the other hand, the calculation and application of the offset amounts for the systematic local leak and the random local leak solves the above-mentioned problem. Specifically, the individual correction circuit 11 may take steps to reduce only the random local leak after a correction is performed on the systematic local leak. In general, the correction range in the offset amount to deal with the systematic local leak is wide, but the resolution may be lowered. Meanwhile, the correction range in the offset amount to deal with the random local leak is narrow, but it is necessary to increase the resolution. Thus, the common correction circuit 12 to deal with the systematic local leak and the individual correction circuit 11 to deal with the random local leak are separately provided. This results in suppression of an increase in chip area, power consumption, and cost, and enables correction with high accuracy in a wide correction range.

Second Exemplary Embodiment

Figure 2:
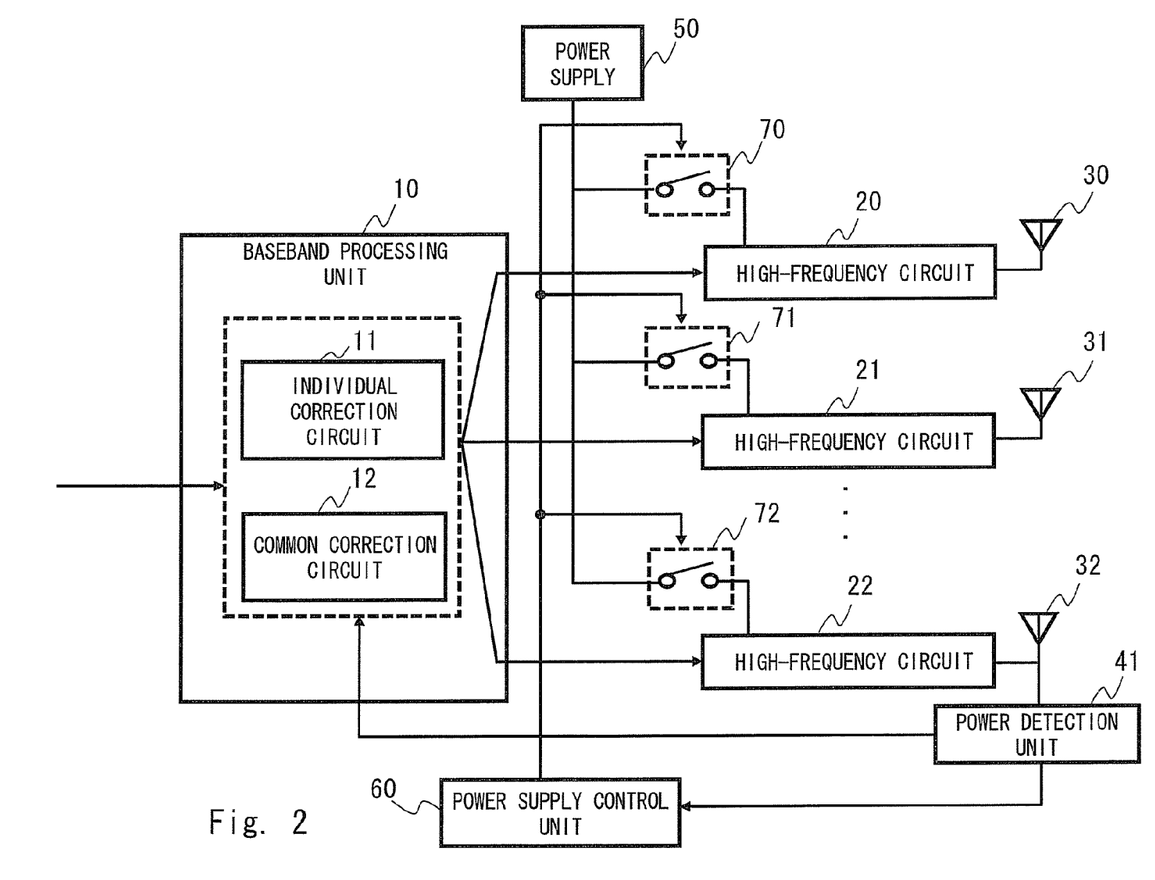
FIG. 2 is a block diagram of a wireless device according to a second exemplary embodiment.

Referring next to FIG. 2, a configuration example of a wireless communication device according to a second exemplary embodiment of the present invention will be described. The wireless communication device includes the baseband processing unit 10, the high-frequency circuits 20 to 22, the antennas 30 to 32, a power detection unit 41, a power supply 50, a power supply control unit 60, and switches 70 to 72. The baseband processing unit 10, the high-frequency circuits 20 to 22, and the antennas 30 to 32 have the same configurations as those of FIG. 1, and thus are denoted by the same reference numerals. The baseband processing unit 10 includes the individual correction circuit 11 and the common correction circuit 12, as with the configuration shown in FIG. 1.

The power supply 50 supplies power to the high-frequency circuits 20 to 22 through the switches 70 to 72, respectively. The power supply control unit 60 controls ON/OFF states of the switches 70 to 72. In such a configuration, in order to cause only the high-frequency circuit, the high-frequency signal power of which is to be detected, to be turned on, the power supply control unit 60 turns on only the switch connected to the detection-target high-frequency circuit. Accordingly, the power supply 50 supplies power only to the high-frequency circuit whose switch is turned on, and the high-frequency circuit supplied with power outputs the high-frequency signal.

The power supply control unit 60 selects a high-frequency circuit, the power detection for which has not been executed, by using the power detection result output from the power detection unit 41, and switches the switch connected to the selected high-frequency circuit to the ON state. When the power of the output signal is detected by the power detection unit 41 and the correction is completed by the individual correction circuit 11, the power supply control unit 60 switches the switch from the ON state to the OFF state.

The power detection unit 41 is connected to each of the high-frequency circuit 22 and the antenna 32. In this case, the power detection unit 41 may be connected to each of the high-frequency circuit 20 and the antenna 30, or may be connected to each of the high-frequency circuit 21 and the antenna 31. That is, the power detection unit 41 may be connected to any of the high-frequency circuits and any of the antennas.

When the switch 72 is in the ON state and the other switches are in the OFF state, the power detection unit 41 detects power by using the high-frequency signal output from the high-frequency circuit 22. In this case, when the switch 70 or 71 is in the ON state and the other switches are in the OFF state, the power detection unit 41 receives the signal transmitted from the antenna 30 or 31 through the antenna 32. The power detection unit 41 can also detect the power of signals output from the high-frequency circuits 20 and 21, which are not directly connected to the power detection unit 41, by using the signal received through the antenna 32. This eliminates the need to provide a power detection unit to each of the high-frequency circuits, thereby preventing an increase in chip area.

Figure 3:
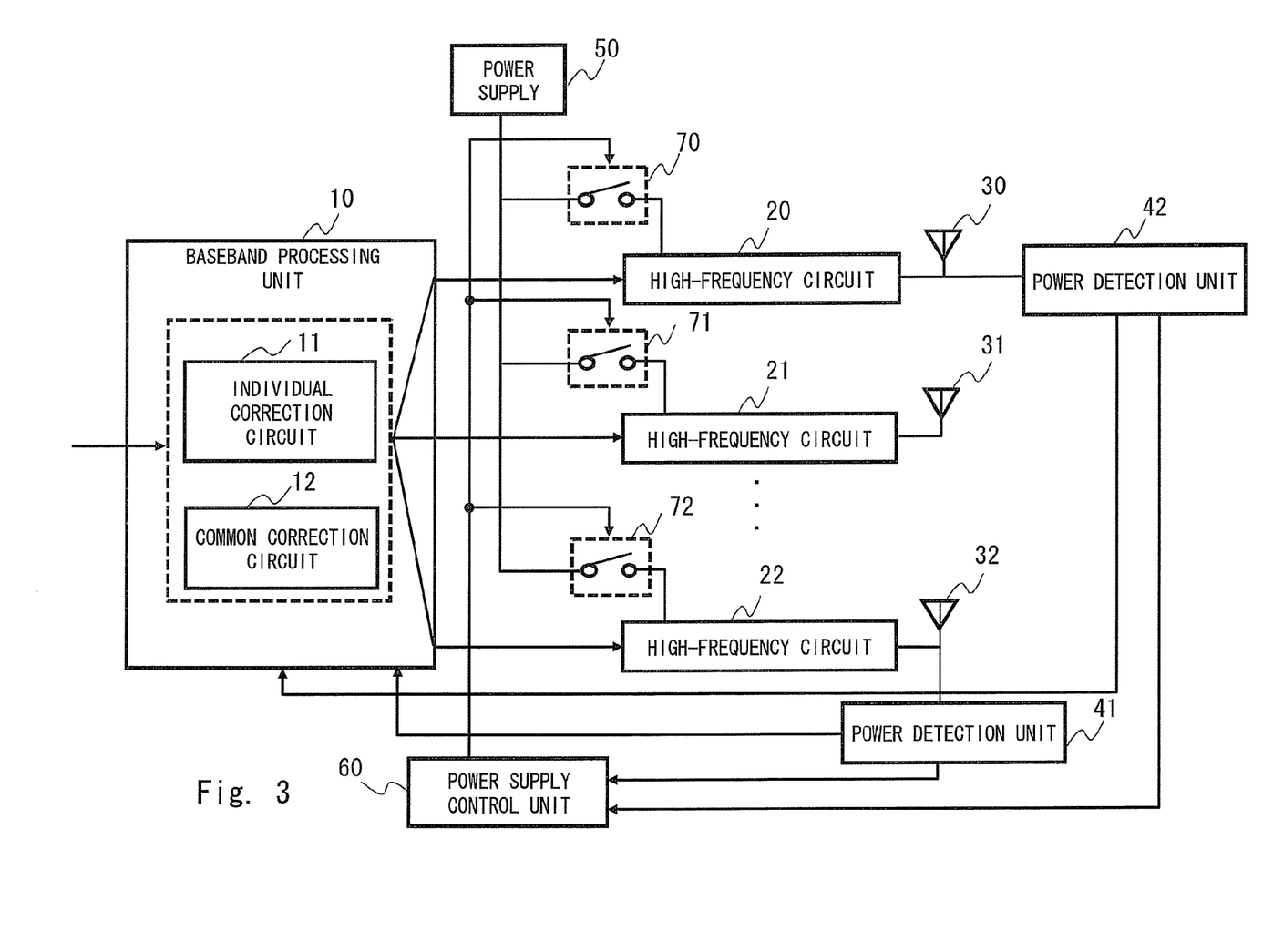
FIG. 3 is a block diagram of the wireless device according to the second exemplary embodiment.
Figure 4:
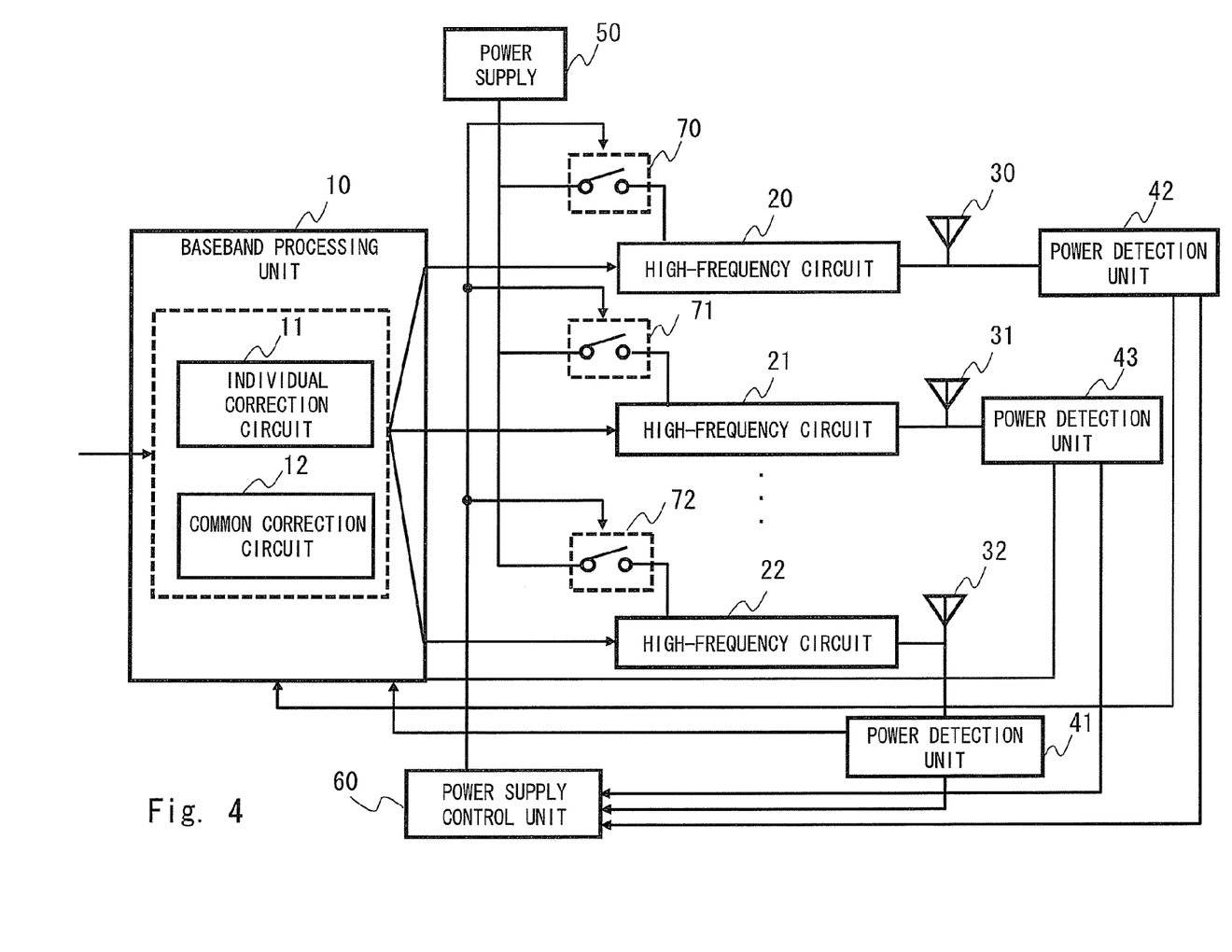
FIG. 4 is a block diagram of the wireless device according to the second exemplary embodiment.

As shown in FIG. 3, a power detection unit 42 may be added to the high-frequency circuit 20, as well as the high-frequency circuit 22. In this case, the signal transmitted from the antenna 31 is received by the power detection units 41 and 42. This enables the wireless communication device to detect the power of the high-frequency signal output from the high-frequency circuit 21 with an accuracy higher than that of the wireless communication device shown in FIG. 2. The power detection unit 41 may be connected to each of the high-frequency circuits 22 and 20, and only one power detection unit may be used. Further, as shown in FIG. 4, the power detection units 41 to 43 may be connected to all the high-frequency circuits 20 to 22 within the wireless device. Alternatively, in the case of connecting the power detection units to all the high-frequency circuits 20 to 22, one power detection unit may be connected to each of the high-frequency circuits 20 to 22.

Figure 5:
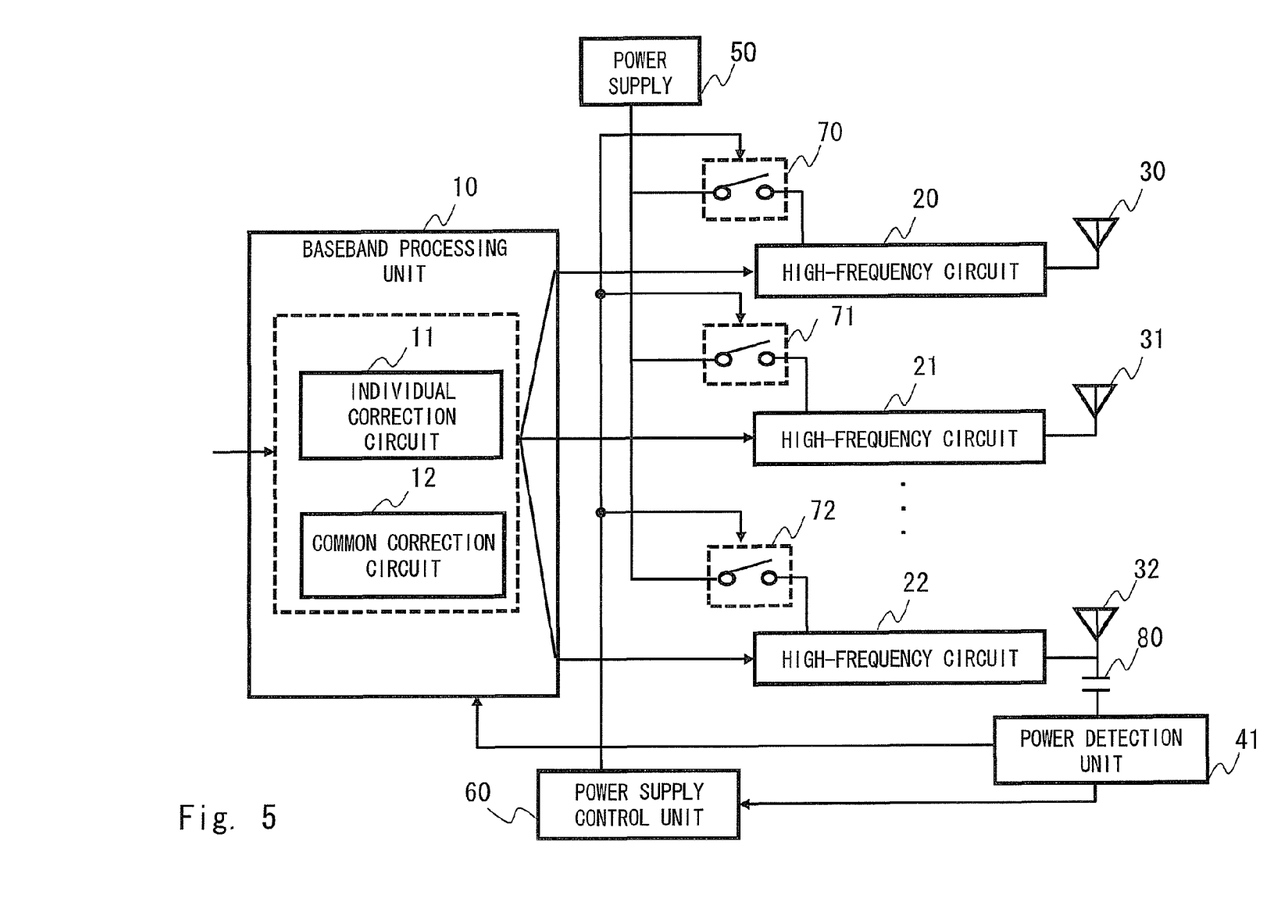
FIG. 5 is a block diagram of the wireless device according to the second exemplary embodiment.

As shown in FIG. 5, the power detection unit 41, the high-frequency circuit 22, and the antenna 32 may be connected together through a capacitative element 80. In this manner, the power detection unit 41 is connected to each of the high-frequency circuit 22 and the antenna 32 through the capacitative element 80, thereby making it possible to separately detect a DC potential. The term "DC potential" herein described refers to a potential representing local leaks.

Figure 6:
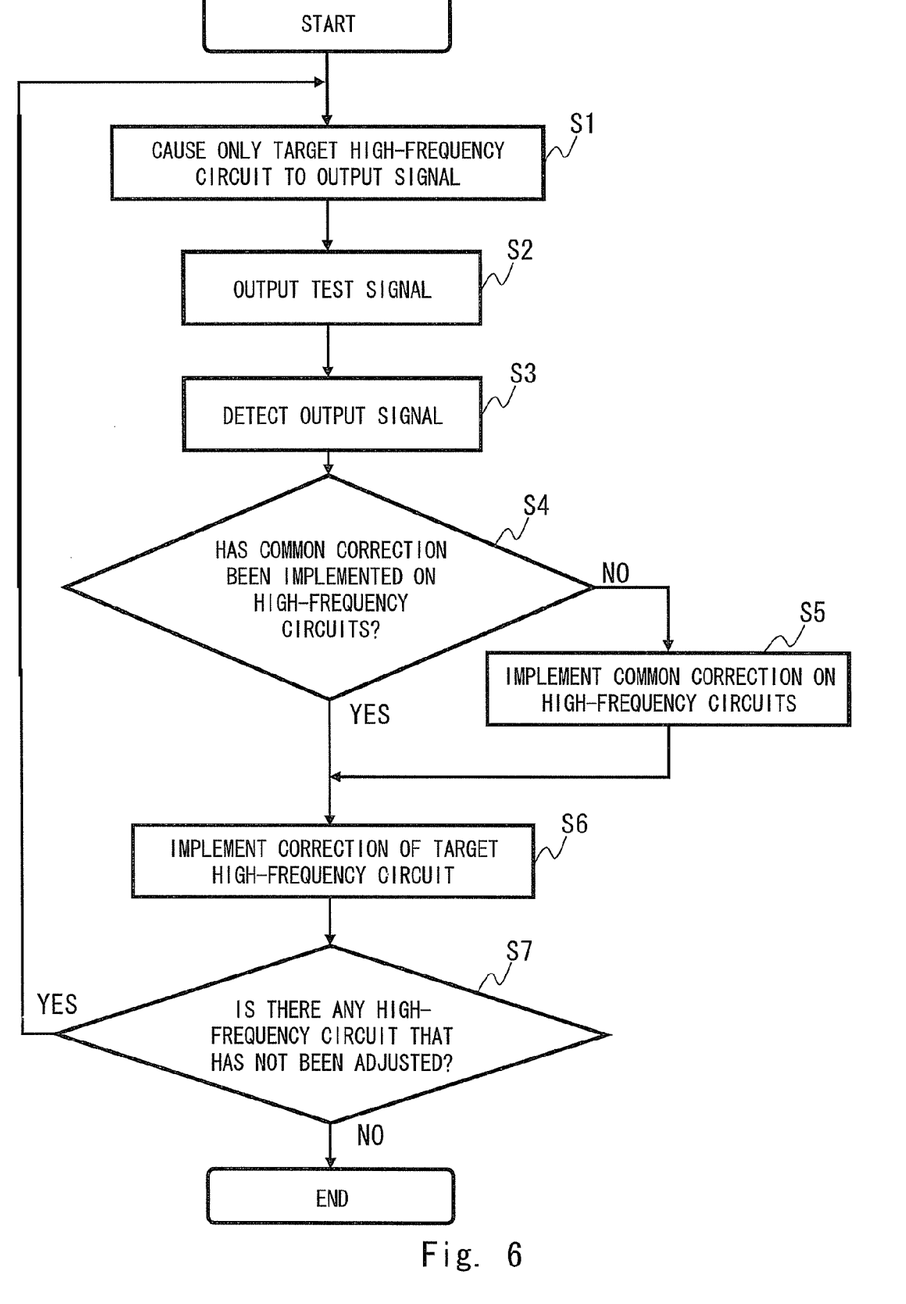
FIG. 6 is a sequence of correction processing according to the second exemplary embodiment.

Referring next to FIG. 6, a description is given of a flow of correction processing in the wireless communication device according to the second exemplary embodiment of the present invention.

First, the power supply control unit 60 causes only the high-frequency circuit, the high-frequency signal power of which is to be detected, to output a signal. Accordingly, the power supply control unit 60 turns on the switch connected to the target high-frequency circuit (S1). Next, the baseband processing unit 10 outputs test signals to the plurality of high-frequency circuits (S2). The test signals are, for example, signals having an amplitude of 0.

Next, the power detection unit 41 detects the power of the high-frequency signal output from the high-frequency circuit (S3). The high-frequency circuit receives the signal having an amplitude of 0. Therefore, the signal output from the high-frequency circuit includes only the local leak which is a leak of a local signal. Consequently, the local leak can be detected by detecting the power of the signal output from the high-frequency circuit.

Next, the baseband processing unit 10 determines whether a common correction has been performed on the signals to be output to the plurality of high-frequency circuits (S4). When determining that the common correction has been performed, the baseband processing unit 10 performs a correction on the signal to be output to the high-frequency signal having output the high-frequency signal, by using the individual correction circuit 11 (S6). Specifically, the individual correction circuit 11 determines the amount of offset to be added to the signal so as to reduce the power of the local leak output from the power detection unit 41. Further, the individual correction circuit 11 outputs the signal including the determined offset amount to the high-frequency circuit.

When determining that the common correction has not been performed, the baseband processing unit 10 performs the common correction on the signals to be output to the plurality of high-frequency circuits from the baseband processing unit 10, by using the common correction circuit 12 (S5). After carrying out the common correction, the baseband processing unit 10 performs a correction on the signal to be output to the high-frequency circuit having output the high-frequency signal, by using the individual correction circuit 11 (S6).

Next, the baseband processing unit 10 determines whether there is a signal, to which the offset amount is not added, among the signals to be output to the high-frequency circuits (S7). When the offset amount is added to all the signals and the correction is completed, the processing is ended. When there is a signal to which the offset amount is not added, the process returns to step S1 and the power supply control unit 60 performs control to output a signal from a different high-frequency circuit.

In the flow of processing described above, the common correction circuit 12 may perform the correction once, for example. The wireless communication device holds the offset amount, which has been used to carry out the correction, in a storage area or the like within the wireless communication device. In the case of using the wireless device, steps S1 to S4 are omitted and step S5 is carried out, thereby simplifying the procedure during the use of the wireless device. The correction to be commonly carried out as described above may be carried out multiple times at certain time intervals. The individual correction circuit 11 needs to perform the correction at the start of using the wireless device and at a time after an appropriate time interval. This is because the optimum value of the offset amount for use in the individual correction circuit 11 varies due to a change in external conditions, such as a temperature change.

Third Exemplary Embodiment

Figure 7:
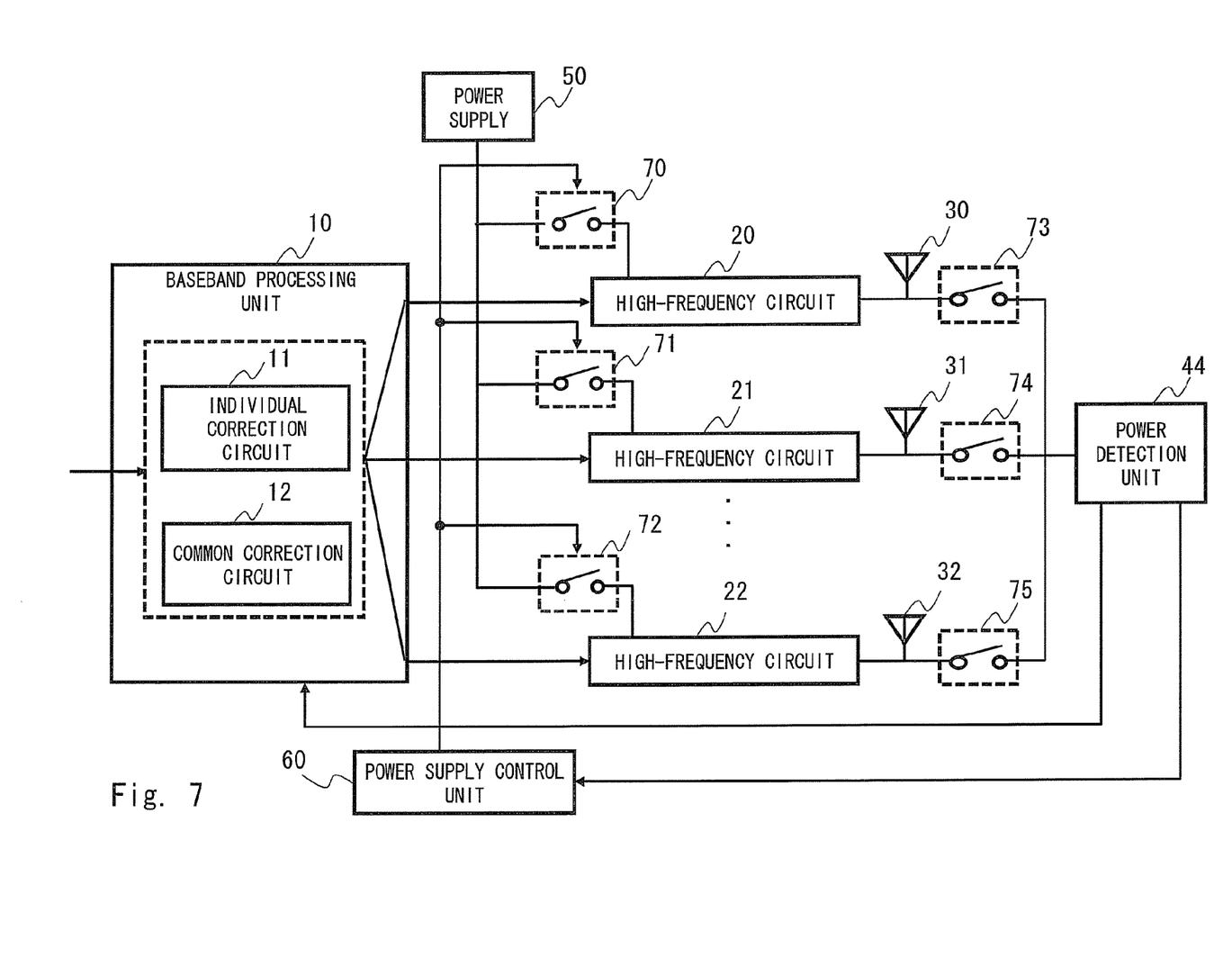
FIG. 7 is a block diagram of a wireless device according to a third exemplary embodiment.

Referring next to FIG. 7, a configuration example of a wireless communication device according to a third exemplary embodiment of the present invention will be described. The wireless communication device shown in FIG. 7 includes a switch 73 which is provided between the high-frequency circuit 20 and a power detection unit 44. Additionally, a switch 74 is provided between the high-frequency circuit 21 and the power detection unit 44, and a switch 75 is provided between the high-frequency circuit 22 and the power detection unit 44. Any of the switches 73 to 75 is turned on, thereby allowing the power detection unit 44 to detect the power of the high-frequency signal output from the high-frequency circuit corresponding to the turned-on switch. The switch 70 and the switch 73 may operate in synchronization with each other. Specifically, along with the switching of the switch 70 to the ON state, the switch 73 may also be controlled to be switched to the ON state. For example, the power supply control unit 60 may simultaneously switch the switch 70 and the switch 73 from the OFF state to the ON state or from the ON state to the OFF state. Similarly, the switches 71 and 74 may operate in synchronization with each other, and the switches 72 and 75 may operate in synchronization with each other.

In this configuration, only the high-frequency circuit, the power of which is to be detected, outputs a signal to the power detection unit 44. The use of the switches 73 to 75 prevents the effects of crosstalk that occurs between the antennas 30 to 32. That is, the signal transmitted from the antenna 30 can be prevented from being received by the antenna 31 or the antenna 32 and from being output to the power detection unit 44.

When the baseband processing unit 10 outputs data having an amplitude to the high-frequency circuits 20 to 22 to perform actual communication via the antennas 30 to 32, for example, the power supply control unit 60 releases the interlocking between the switches 70 to 72 and the switches 73 to 75. Further, all the switches 73 to 75 are turned off, and the power supply control unit 60 switches the switches 70 to 72 to the ON state as needed.

If the crosstalk between the antennas 30 to 32 is negligible, the antenna 30 receives no signal from the antenna 31, for example. Accordingly, in this case, the control may be performed to turn on all the switches 70 to 72 to switch the switches 73 to 75.

Fourth Exemplary Embodiment

Figure 8:
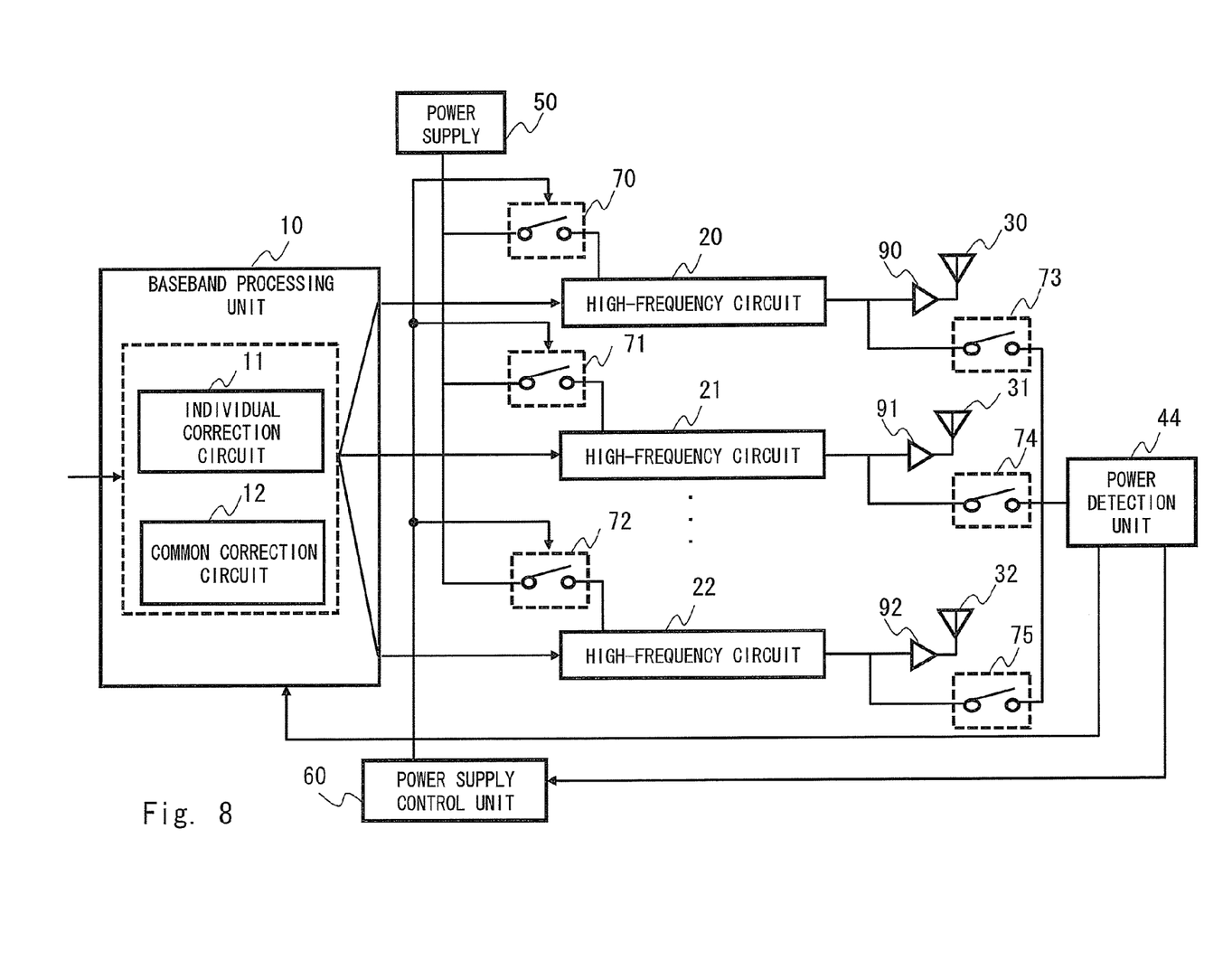
FIG. 8 is a block diagram of a wireless device according to a fourth exemplary embodiment.

Referring next to FIG. 8, a configuration example of a wireless communication device according to a fourth exemplary embodiment of the present invention will be described. The wireless communication device shown in FIG. 8 includes an amplification unit 90 which is provided between the high-frequency circuit 20 and the antenna 30. The switch 73 is provided between the input side of the amplification unit 90 and the power detection unit 44. Similarly, an amplification unit 91 is provided between the high-frequency circuit 21 and the antenna 31, and an amplification unit 92 is provided between the high-frequency circuit 22 and the antenna 32. The provision of the amplification unit 90 in the manner as described above prevents leakage of the signal, which is transmitted from the antenna 31 or 32 to the antenna 30, to the power detection unit 44. The same advantageous effect can be obtained by providing the amplification units 91 and 92. Therefore, the provision of the amplification units 90 to 92 eliminates the crosstalk between the antennas 30 to 32.

Fifth Exemplary Embodiment

Figure 9:
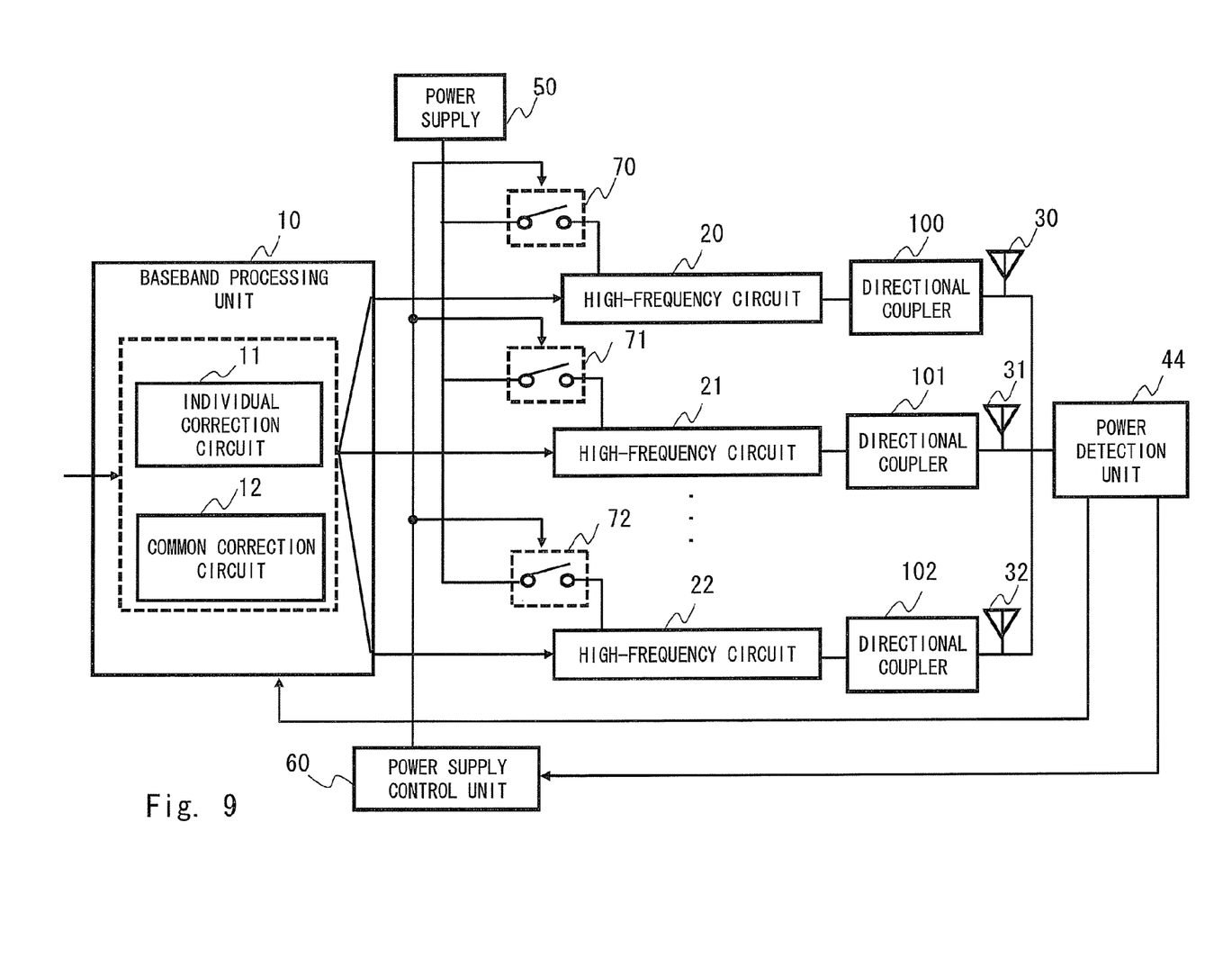
FIG. 9 is a block diagram of a wireless device according to a fifth exemplary embodiment.

Referring next to FIG. 9, a configuration example of a wireless communication device according to a fifth exemplary embodiment of the present invention will be described. The wireless communication device shown in FIG. 9 includes a directional coupler 100 which is provided between the high-frequency circuit 20 and the antenna 30. Additionally, a directional coupler 101 is provided between the high-frequency circuit 21 and the antenna 31, and a directional coupler 102 is provided between the high-frequency circuit 22 and the antenna 32.

The directional couplers 100 to 102 output the high-frequency signals, which are output from the high-frequency circuits 20 to 22, to the antennas 30 to 32, respectively, with an extremely small loss, and distribute the high-frequency signals, which are output from the high-frequency circuits 20 to 22, to the power detection unit 44. This enables detection of the power of the signal output from the high-frequency circuit corresponding to any of the turned-on switches 70 to 72.

Further, the directional couplers 100 to 102 output the signals, which are output from the high-frequency circuits 20 to 22, to the antennas 30 to 32, respectively, and to the power detection unit 44. However, the signals from the antennas 30 to 32 and the power detection unit 44 are prevented from being output to the high-frequency circuits 20 to 22. Therefore, the use of the directional couplers 100 to 102 prevents leakages of the signals from the antennas 30 to 32 and the power detection unit 44 to the high-frequency circuits 20 to 22.

Sixth Exemplary Embodiment

Figure 10:
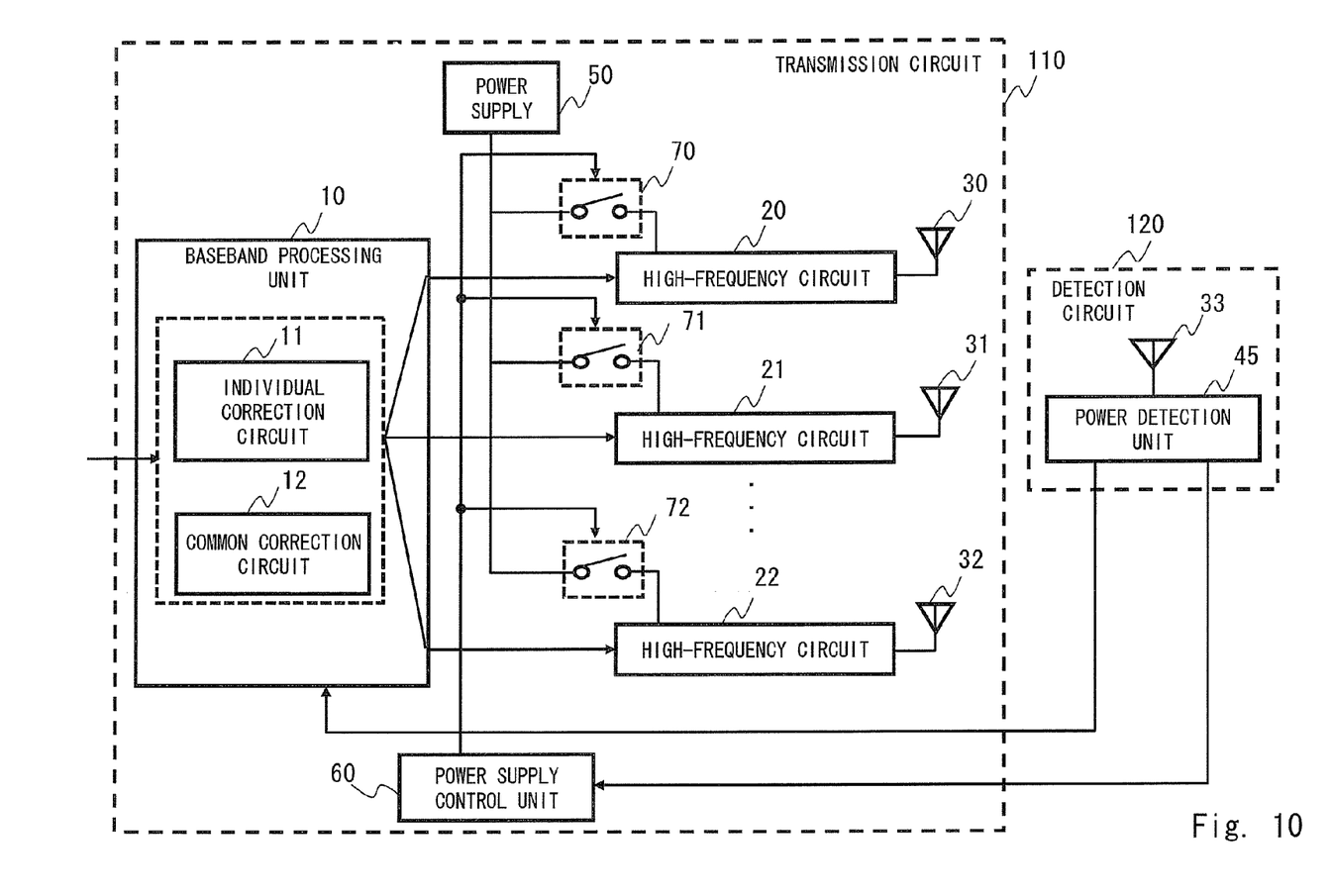
FIG. 10 is a block diagram of a wireless device according to a sixth exemplary embodiment.

Referring next to FIG. 10, a configuration example of a high-frequency circuit system according to a sixth exemplary embodiment of the present invention will be described. The high-frequency circuit system includes a transmitting circuit 110 and a detection circuit 120. The transmitting circuit 110 includes the baseband processing unit 10, the high-frequency circuits 20 to 22, the antennas 30 to 32, the power supply 50, the power supply control unit 60, and the switches 70 to 72. The detection circuit 120 includes an antenna 33 and a power detection unit 45.

The antenna 33 is a dedicated antenna which is provided to receive the high-frequency signals transmitted from the antennas 30 to 32. The detection circuit 120 can receive the high-frequency signals output from the high-frequency circuits 20 to 22 by wireless communication between the antennas 30 to 32 and the antenna 33, and can detect power. Since the antenna 33 is a dedicated antenna, the antenna shape and the layout method of the antenna 33 can be appropriately adjusted so as to receive the high-frequency signals transmitted from the antennas 30 to 32. Accordingly, the antenna 33 can detect the power of the signals output from the high-frequency circuits 20 to 22 with a higher sensitivity than that of the antennas for transmitting and receiving the high-frequency signals, such as the antennas 30 to 32 according to the second exemplary embodiment of the present invention. If a receiving circuit is provided in addition to the transmitting circuit 110 in the wireless communication device, the detection unit may be connected to an antenna provided in the receiving circuit. This eliminates the need for a dedicated antenna for the detection unit, resulting in downsizing of the antenna and reduction in cost.

Note that the present invention is not limited to the above exemplary embodiments, but may be modified as appropriate without departing from the scope of the present invention.

Exemplary embodiments of the present invention have been described above, but the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2010-102343, filed on Apr. 27, 2010, the disclosure of which is incorporated herein in its entirety by reference.

REFERENCE SIGNS LIST

10 BASEBAND PROCESSING UNIT
11 INDIVIDUAL CORRECTION CIRCUIT
12 COMMON CORRECTION CIRCUIT
20-22 HIGH-FREQUENCY CIRCUIT
30-33 ANTENNA
40-45 POWER DETECTION UNIT
50 POWER SUPPLY
60 POWER SUPPLY CONTROL UNIT
70-75 SWITCH
80 CAPACITATIVE ELEMENT
90-92 AMPLIFICATION UNIT
100-102 DIRECTIONAL COUPLER
110 TRANSMITTING CIRCUIT
120 DETECTION CIRCUIT

The invention claimed is:

1. A wireless communication device comprising:
a plurality of high-frequency circuits that convert an input signal into a high-frequency signal;
a power detection unit that detects power of the high-frequency signal output from each of the high-frequency circuits;
a first correction circuit that performs a common correction on the input signal to be output to each of the high-frequency circuits, to reduce local leaks occurring in the high-frequency circuits, according to the power of at least one high-frequency signal detected by the power detection unit; and
a second correction circuit that performs a correction for each input signal to be output to the high-frequency circuits, to reduce local leaks occurring in the high-frequency circuits, according to the power of each high-frequency signal detected by the power detection unit.

2. The wireless communication device according to claim 1, further comprising a power supply control unit that controls power supply to the high-frequency circuits and switching the high-frequency circuits to be activated.

3. The wireless communication device according to claim 2, wherein the power detection unit is connected to each of the high-frequency circuits through a switch, and the high-frequency circuit, the high-frequency signal power of which is to be detected, is switched by switching the switch.

4. The wireless communication device according to claim 3, further comprising a power supply control unit that switches the switch so as to be connected to a high-frequency circuit being supplied with power from the power supply by using a power detection result output from the power detection unit.

5. The wireless communication device according to claim 2, wherein the power detection unit is connected to each of the high-frequency circuits through a directional coupler.

6. The wireless communication device according to claim 1, wherein the power detection unit is connected to at least one of the high-frequency circuits, and is configured to detect power of a high-frequency signal output from the high-frequency circuit connected with the power detection unit, and to detect power of a high-frequency signal output from a high-frequency circuit that is not connected with the power detection unit, by using a radio signal output from the high-frequency circuit that is not connected with the power detection unit.

7. The wireless communication device according to claim 1, wherein
the power detection unit detects power of a signal output from a high-frequency circuit having received a test signal, and
the first and second correction circuits add an offset amount to the test signal to reduce the detected power.

8. A high-frequency circuit system comprising:
a plurality of high-frequency circuits that convert an input signal into a high-frequency signal;

a power detection unit that receives a high-frequency signal transmitted from each of the high-frequency circuits, and detects power of the high-frequency signal;

a first correction circuit that performs a common correction on the input signal to be output to each of the high-frequency circuits, to reduce local leaks occurring in the high-frequency circuits, according to the power of at least one high-frequency signal detected by the power detection unit; and a second correction circuit that performs a correction for each input signal to be output to the high-frequency circuits, to reduce local leaks occurring in the high-frequency circuits, according to the power of each high-frequency signal detected by the power detection unit.

9. A local leak reduction method comprising the steps of:

detecting power of a high-frequency signal output from a high-frequency circuit selected from a plurality of high-frequency circuits that convert an input signal into a high-frequency signal;

performing a common correction on the input signal to be output to each of the high-frequency circuits, to reduce local leaks occurring in the high-frequency circuits, according to the power of the detected high-frequency signal; and performing a correction for each input signal to be output to the high-frequency circuits, to reduce local leaks occurring in the high-frequency circuits, according to the power of each of the detected high-frequency signals.

10. The local leak reduction method according to claim 9, wherein the step of detecting power of a high-frequency signal includes detecting power of the high-frequency signal output from the high-frequency circuit having received a test signal, and the step of performing a common correction on the input signal and the step of performing a correction for each input signal include adding an offset amount to the test signal to reduce the detected power.

\* \* \* \* \*